United States Patent
Koo et al.

(10) Patent No.: US 8,723,647 B2
(45) Date of Patent: May 13, 2014

(54) RFID COMMUNICATION METHOD AND APPARATUS

(75) Inventors: Ji-Hun Koo, Yongin-si (KR);
Young-Hoon Min, Anyang-si (KR);
Si-Gyoung Koo, Seoul (KR); Il-Jong Song, Yongin-si (KR); Myung-Gun Kim, Seoul (KR); Kuang-Woo Nam, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1008 days.

(21) Appl. No.: 12/273,596

(22) Filed: Nov. 19, 2008

(65) Prior Publication Data

US 2009/0167499 A1    Jul. 2, 2009

(30) Foreign Application Priority Data

Dec. 27, 2007   (KR) .................. 10-2007-0138965

(51) Int. Cl.
*H04Q 5/22*   (2006.01)

(52) U.S. Cl.
USPC ..................... 340/10.1; 340/13.26

(58) Field of Classification Search
USPC ........ 340/10.1, 10.3; 370/227, 228, 322, 326, 370/329; 455/450, 464, 509, 515
See application file for complete search history.

(56) References Cited

U.S. PATENT DOCUMENTS

| | | | | |
|---|---|---|---|---|
| 5,574,979 A * | 11/1996 | West | ............................. | 455/63.1 |
| 5,926,469 A * | 7/1999 | Norstedt et al. | .............. | 370/329 |
| 5,940,515 A * | 8/1999 | Kasavaraju | .................... | 380/270 |
| 5,940,771 A * | 8/1999 | Gollnick et al. | .............. | 455/517 |
| 6,005,850 A * | 12/1999 | Moura et al. | .................... | 370/282 |
| 6,104,709 A * | 8/2000 | Rinchiuso et al. | ............ | 370/335 |
| 6,108,519 A * | 8/2000 | Nitta | ............................. | 340/7.27 |
| 6,222,463 B1 * | 4/2001 | Rai | ................................. | 340/928 |
| 6,330,447 B1 * | 12/2001 | Hengeveld | .................... | 455/436 |
| 6,542,747 B1 * | 4/2003 | Syukri | ........................... | 455/450 |
| 6,643,278 B1 * | 11/2003 | Panasik et al. | ................ | 370/330 |
| 6,664,891 B2 * | 12/2003 | Davies et al. | ................. | 340/505 |
| 6,766,947 B2 * | 7/2004 | Wan et al. | ..................... | 235/383 |
| 6,831,909 B1 * | 12/2004 | Koo et al. | ...................... | 370/339 |
| 6,947,513 B2 * | 9/2005 | O'Toole et al. | ................ | 375/374 |
| 6,954,448 B2 * | 10/2005 | Farley et al. | .................. | 370/337 |
| 6,980,797 B1 * | 12/2005 | Tuulos | .......................... | 455/411 |
| 7,005,985 B1 * | 2/2006 | Steeves | ...................... | 340/572.1 |
| 7,023,323 B1 * | 4/2006 | Nysen | ........................... | 340/10.1 |
| 7,023,342 B2 * | 4/2006 | Corbett et al. | ............. | 340/572.1 |
| 7,075,412 B1 * | 7/2006 | Reynolds et al. | ........... | 340/10.2 |
| 7,126,481 B2 * | 10/2006 | Vesikivi et al. | ............ | 340/572.4 |
| 7,145,454 B2 * | 12/2006 | Linjama et al. | ............... | 340/540 |
| 7,176,797 B2 * | 2/2007 | Zai et al. | .................... | 340/572.1 |
| 7,212,822 B1 * | 5/2007 | Vicharelli | ..................... | 455/450 |
| 7,253,717 B2 * | 8/2007 | Armstrong et al. | .......... | 340/10.2 |
| 7,262,709 B2 * | 8/2007 | Borleske et al. | ......... | 340/870.02 |

(Continued)

FOREIGN PATENT DOCUMENTS

| | | |
|---|---|---|
| JP | 2007006092 | 1/2007 |
| KR | 20070034415 | 3/2007 |
| KR | 20070034423 | 3/2007 |
| KR | 20070072253 | 7/2007 |

*Primary Examiner* — Jennifer Mehmood
*Assistant Examiner* — Rufus Point
(74) *Attorney, Agent, or Firm* — Stanzione & Kim, LLP

(57) ABSTRACT

A mobile terminal communicates with a base station to request channel allocation for RFID communication, receives a channel from the base station, and communicates with an RFID tag through the allocated channel.

11 Claims, 7 Drawing Sheets

(56) References Cited

U.S. PATENT DOCUMENTS

| | | | |
|---|---|---|---|
| 7,289,810 B2* | 10/2007 | Jagadeesan et al. | 455/439 |
| 7,295,101 B2* | 11/2007 | Ward et al. | 340/10.1 |
| 7,299,987 B2* | 11/2007 | Yoo et al. | 235/472.01 |
| 7,336,631 B2* | 2/2008 | Okubo | 370/329 |
| 7,432,814 B2* | 10/2008 | Dietrich et al. | 340/572.4 |
| 7,436,308 B2* | 10/2008 | Sundstrom et al. | 340/572.4 |
| 7,471,204 B2* | 12/2008 | Safarian et al. | 340/572.1 |
| 7,477,619 B2* | 1/2009 | Lee et al. | 370/328 |
| 7,502,619 B1* | 3/2009 | Katz | 455/456.5 |
| 7,525,431 B2* | 4/2009 | Britton et al. | 340/572.1 |
| 7,580,724 B2* | 8/2009 | Ueda | 455/550.1 |
| 7,589,616 B2* | 9/2009 | Klatsmanyi et al. | 340/10.1 |
| 7,589,618 B2* | 9/2009 | Diorio et al. | 340/10.2 |
| 7,592,897 B2* | 9/2009 | Diorio et al. | 340/10.2 |
| 7,595,723 B2* | 9/2009 | Heitzmann et al. | 340/539.12 |
| 7,639,135 B2* | 12/2009 | Arms et al. | 340/572.1 |
| 7,667,572 B2* | 2/2010 | Husak et al. | 340/10.1 |
| 7,688,778 B2* | 3/2010 | Ogushi | 370/328 |
| 7,688,782 B2* | 3/2010 | Kawaguchi et al. | 370/329 |
| 7,701,341 B2* | 4/2010 | Kumar et al. | 340/572.1 |
| 7,796,014 B2* | 9/2010 | Traub et al. | 340/10.1 |
| 7,817,014 B2* | 10/2010 | Krishna et al. | 340/10.4 |
| 7,818,013 B2* | 10/2010 | Li et al. | 455/452.2 |
| 7,893,834 B2* | 2/2011 | Park et al. | 340/572.1 |
| 7,899,394 B2* | 3/2011 | Rofougaran | 455/41.1 |
| 7,902,982 B2* | 3/2011 | Tanaka | 340/572.1 |
| 7,917,088 B2* | 3/2011 | Hyde et al. | 455/41.2 |
| 7,957,356 B2* | 6/2011 | Wang et al. | 370/338 |
| 7,969,282 B2* | 6/2011 | Powell et al. | 340/10.2 |
| 7,974,242 B2* | 7/2011 | Yang et al. | 370/332 |
| 7,978,050 B2* | 7/2011 | Moshfeghi | 340/10.2 |
| 8,090,616 B2* | 1/2012 | Proctor et al. | 705/21 |
| 8,107,968 B2* | 1/2012 | Kasslin et al. | 455/451 |
| 2001/0023446 A1* | 9/2001 | Balogh | 709/229 |
| 2002/0006120 A1* | 1/2002 | Suzuki et al. | 370/329 |
| 2002/0065082 A1* | 5/2002 | Yegani et al. | 455/452 |
| 2003/0028623 A1* | 2/2003 | Hennessey et al. | 709/219 |
| 2003/0120745 A1* | 6/2003 | Katagishi et al. | 709/217 |
| 2003/0164752 A1* | 9/2003 | Haimovitch et al. | 340/10.34 |
| 2003/0174671 A1* | 9/2003 | Chen | 370/329 |
| 2003/0186704 A1* | 10/2003 | Tamura et al. | 455/450 |
| 2004/0203383 A1* | 10/2004 | Kelton et al. | 455/41.2 |
| 2005/0093679 A1* | 5/2005 | Zai et al. | 340/10.2 |
| 2005/0096073 A1* | 5/2005 | Bahl et al. | 455/516 |
| 2005/0206555 A1* | 9/2005 | Bridgelall et al. | 342/127 |
| 2005/0255839 A1* | 11/2005 | Perttila | 455/419 |
| 2005/0287982 A1* | 12/2005 | Brewer et al. | 455/405 |
| 2006/0007887 A1* | 1/2006 | Kwon et al. | 370/329 |
| 2006/0039316 A1* | 2/2006 | Ogushi | 370/328 |
| 2006/0154670 A1* | 7/2006 | Miyabayashi et al. | 455/450 |
| 2006/0158310 A1* | 7/2006 | Klatsmanyi et al. | 340/10.1 |
| 2006/0208925 A1* | 9/2006 | Wassingbo | 340/990 |
| 2006/0220838 A1* | 10/2006 | Wakim et al. | 340/539.12 |
| 2006/0238305 A1* | 10/2006 | Loving et al. | 340/10.1 |
| 2006/0273882 A1* | 12/2006 | Posamentier | 340/10.4 |
| 2006/0279409 A1* | 12/2006 | Yang et al. | 340/10.2 |
| 2007/0015465 A1* | 1/2007 | Giroud et al. | 455/41.2 |
| 2007/0121751 A1* | 5/2007 | Li et al. | 375/267 |
| 2007/0139162 A1* | 6/2007 | Bandy et al. | 340/10.2 |
| 2007/0159302 A1* | 7/2007 | Park | 340/10.2 |
| 2007/0205865 A1* | 9/2007 | Rofougaran et al. | 340/10.1 |
| 2007/0229270 A1* | 10/2007 | Rofougaran | 340/572.1 |
| 2007/0254601 A1* | 11/2007 | Li et al. | 455/88 |
| 2007/0273486 A1* | 11/2007 | Shiotsu et al. | 340/10.34 |
| 2007/0293232 A1* | 12/2007 | Nonaka | 455/450 |
| 2008/0009257 A1* | 1/2008 | Safarian et al. | 455/307 |
| 2008/0034064 A1* | 2/2008 | Choi et al. | 709/219 |
| 2008/0297312 A1* | 12/2008 | Moshfeghi | 340/10.1 |
| 2009/0143104 A1* | 6/2009 | Loh et al. | 455/558 |
| 2009/0146791 A1* | 6/2009 | Jantunen et al. | 340/10.2 |
| 2009/0149136 A1* | 6/2009 | Rofougaran | 455/77 |
| 2010/0001843 A1* | 1/2010 | Bae et al. | 340/10.2 |
| 2010/0153533 A1* | 6/2010 | Chung | 709/223 |
| 2010/0302005 A1* | 12/2010 | Popovski | 340/10.1 |

* cited by examiner

RFID COMMUNICATION METHOD AND APPARATUS

CROSS-REFERENCE TO RELATED APPLICATIONS

This U.S. non-provisional patent application claims priority under 35 U.S.C. §119 of Korean Patent Application No. 10-2007-0138965 filed on Dec. 27, 2007, the entire contents of which are incorporated herein by reference.

BACKGROUND OF THE INVENTION

1. Field of the Invention

The present general inventive concept relates to radio frequency identification (RFID) communication, and more particularly, to a system to minimize interference between mobile RFID readers.

2. Description of the Related Art

An RFID system, one of systems employing radio-frequency identification technology, includes a tag (electronic tag or transponder) having peculiar identification information, and an RFID reader (reader or interrogator or radio frequency identification reader) capable of reading information of the tag using wireless communication. The RFID systems can be divided into mutual induction and electromagnetic wave types in accordance with a pattern of mutual communication between a tag and a reader, active and passive types in accordance with whether a tag is powered up by itself, or long-wave, medium-wave, short-wave, ultrashort-wave, and microwave types in accordance with frequency.

RFID systems using an ultrahigh frequency (UHF) band about 900 MHz are used in varieties of applications, accompanying with stationary and handheld readers, on basis of several standards such as ISO 18000-6 Type A/B EPC C1, C1-Gen2. In recent years, RFID systems are utilized for supply chain management (SCM), traceability management (TM), asset management (AM), and production management (PM).

Especially, the RFID system of UHF band makes it possible to conduct various application services because of long identification intervals. However, the RFID system inevitably connotes problems such as signal interference with variant wireless communication like cellular communication, or signal interference and conflict between readers in a multi-reader environment. To solve such problems, established is a spectrum mask in an RFID frequency band. And, a channel access scheme, such as frequency hopping (FP) or listening-before-talking (LBT), is proposed to solve the signal interference and conflict of the multi-reader environment, which cannot be resolved even by the spectrum mask.

In the meantime, a ubiquitous sensor network (USN) is a technique for identifying objects and environments by sticking electronic tags on all things, and establishing and utilizing real-time information by way of network. The USN is eventually directed to a communicable environment regardless of kinds of networks, devices, and services, anytime and anywhere, by granting computing and communicating functions to all things.

In efforts for achieving such a USN, an RFID reader function is included into a mobile phone. In this description, a mobile device, such a mobile phone including the RFID reader function, is referred to as mobile RFID reader. When the mobile RFID readers are used in a place, a single tag is accessed by a plurality of the mobile RFID readers.

For example, regarding a case of obtaining information about film screening, synopsis, and castings by accessing a tag attached to a movie poster by means of the RFID reader function, a plurality of users each having the mobile RFID readers are locating so near to each other (e.g., within several meters) and convenient to take points for accessing the tag. For that reason, the FP or LBT is not insufficient to resolve the signal interference and conflict between the mobile RFID readers.

SUMMARY OF THE INVENTION

The present general inventive concept provides a system capable of preventing signal interference and conflict between mobile RFID readers.

Additional aspects and utilities of the present general inventive concept will be set forth in part in the description which follows and, in part, will be obvious from the description, or may be learned by practice of the general inventive concept.

In an embodiment and utility of the present general inventive concept, there is provided an RFID communication method for a mobile terminal communicating with a base station. The method may include requesting channel allocation from the base station for RFID communication, allocating a channel from the base station, and communicating with an RFID tag through the allocated channel.

The number of the allocated channels may be one or plural.

The allocating the channel may include allocating one or more channels each to plurality of operation times from the base station.

The communicating with the RFID tag through the allocated channel may be carried out by one of frequency hopping and listen-before-talking schemes through the plural channels respective to the plural operation times.

The communicating the RFID tag may include accessing the RFID tag through the allocated channel, receiving tag identification from the RFID tag, transmitting the tag identification to the base station, and receiving service information from the base station in correspondence with the tag identification.

The allocating the channel may include sending the channel allocation request from the base station to a control server for communication with the RFID tag, and transmitting the allocated channel to the base station from the control server.

The communicating with the RFID tag may include accessing the RFID tag through the allocated channel, receiving tag identification from the RFID tag, transmitting the tag identification to the control server from the base station, transmitting service information to the base station from the control server in correspondence with the tag identification, and receiving the service information from the base station in correspondence with the tag identification.

In an embodiment and utility of the present general inventive concept, there is also provided an RFID communication method of an RFID system including a control server, a bas station, and a mobile terminal. The method may include sending a channel allocation request to the base station from the mobile terminal for communication with an RFID tag, sending the channel allocation request to the control server from the base station from the mobile terminal for communication with the RFID tag, transmitting an allocated channel to the base station from the control server, transmitting the allocated channel to the mobile terminal from the base station, and communication with the RFID tag through the allocated channel.

The number of the channels allocated by the control server may be one or plural.

The transmitting the allocated channel to the base station from the control server may include transmitting one or more channels, which are allocated to the plurality of times, from the control server.

The communicating with the RFID tag may be carried out by one of frequency hopping and listen-before-talking schemes through the plural channels respective to the plural times.

The communicating the RFID tag may include accessing the RFID tag through the allocated channel, receiving tag identification from the RFID tag, transmitting the tag identification to the base station, and receiving service information from the base station in correspondence with the tag identification.

In an embodiment and utility of the present general inventive concept, there is also provided an RFID system including a mobile terminal to access an external tag according to a selected one of channel and/or time allocations.

The mobile terminal may access another external tag according to a selected another one of the channel and/or time allocations.

The mobile terminal may include an output unit to output at least one of data, an image, and a sound, and an interface unit to communicate with the external tag and to communicate with an external base station to receive the selected one of the channel and/or time allocations.

The mobile terminal may include a memory unit to store the channel and/or time allocations.

The mobile terminal may include a controller to control the interface unit to receive a signal from an external base station and to communicate with the external tag using the one of the channel and/or time allocations according to the received signal.

In an embodiment and utility of the present general inventive concept, there is also provided an RFID system including a base station to select one of channel and/or time allocations according to a request of a mobile terminal and to transmit the selected one to the mobile terminal such that the mobile terminal receives an RFID from a tag using the selected one of the channel and/or time allocations.

The base station may select another one of the channel and/or time allocations according to another request of another mobile terminal and to transmit the selected another one to the another mobile terminal such that the another mobile terminal receives another RFID from another tag using the selected another one of the channel and/or time allocations.

In an embodiment and utility of the present general inventive concept, there is also provided an RFID system including a mobile terminal to access an external tag, and a base station to select one of channel and/or time allocations according to a request of the mobile terminal and to transmit the selected one to the mobile terminal such that the mobile terminal receives an RFID from the extern tag using the selected one of the channel and/or time allocations.

The RFID system may further include a second mobile terminal to access a second external tag, and a second base station to select a second one of second channel and/or time allocations according to a request of the mobile terminal and to transmit the selected one to the mobile terminal such that the mobile terminal receives an RFID from the extern tag using the selected one of the second channel and/or time allocations.

According to the embodiment and utilities of the present general inventive concept, it is able to prevent signal interference and conflict between mobile terminals while accessing a tag by the mobile terminals having mobile RFID functions.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
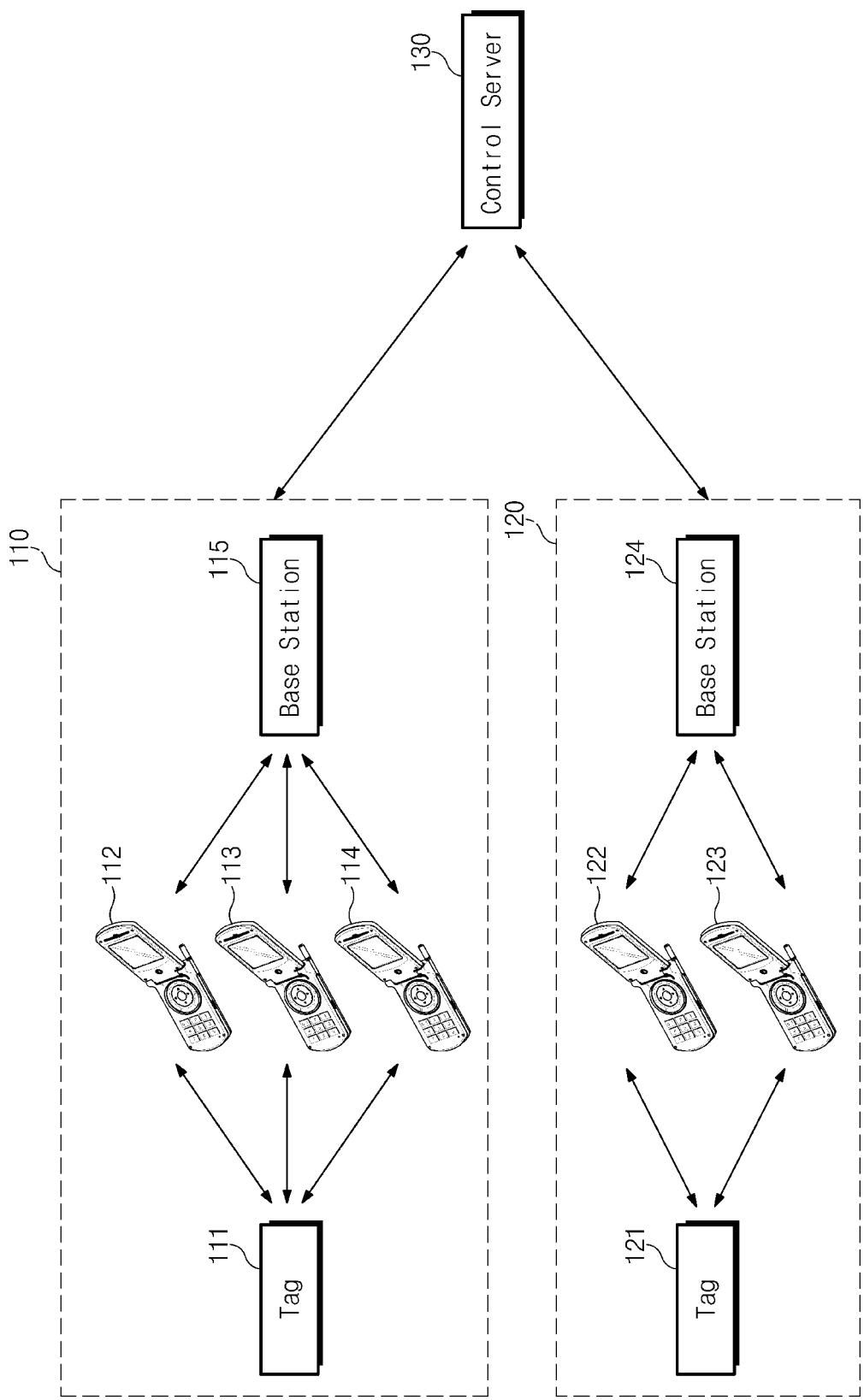
FIG. 1 is a schematic diagram illustrating a mobile RFID system according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

According to the present general inventive concept, for an RFID communication between a base station and a mobile terminal that is operable in radio communication, the mobile terminal requests channel allocation for RFID communication from the base station and, after allocating the channel from the base station, communicates with an RFID tag by way of the allocated channel. Therefore, when a plurality of mobile terminals adjacent to each other is trying to access an RFID tag, it is able to minimize signal interference by allocating the mobile terminals their peculiar RFID communication channels.

FIG. 1 is a schematic view illustrating a mobile RFID system according to an embodiment of the present general inventive concept.

Referring to FIG. 1, the mobile RFID system includes a plurality of RFID tags 111 and 121, a plurality of mobile terminals 112, 113, 114, 122, and 123, a plurality of base stations 115 and 124, and a control server 130. The mobile terminals 112, 113, 114, 122, and 123 include RFID reader functions that enable RFID communication with the RDIF tags 111 and 121, as well as their original functions. Thus, the mobile terminals 112, 113, 114, 122, and 123 can be referred to as 'mobile RFID readers'.

The mobile terminals 112, 113, 114, 122, and 123 can have an output unit to perform their own function, for example, a cell phone function to communicate with another cell phone using wireless communication to transmit or receive data, a memory function to store data (voice or sound data or image data) in a memory unit thereof, a display function to generate a signal to display an image corresponding to data, an audio function to generate a signal to generate sound or voice corresponding to data, a processing function to process data, an image capturing function to capture an image (still or moving image) using a camera or camcorder structure, an image forming function to form an image corresponding to data, and so on.

The base stations 115 and 124 are configured to communicate with the control server 130 in a wired or wireless mode. The base station 115 wirelessly communicates with the mobile terminals 112, 113, and 114 locating in a first area 110. The base station 124 wirelessly communicates with the mobile terminals 122 and 124 locating in a second area 120. The mobile terminals 112, 113, 114, 122, and 123 each include RFID readers to perform the RFID reader function, that is, to conduct RFID communication with the tags 111 and 121. The numbers of the mobile terminals including the first and second areas 110 and 120 may be variable.

The mobile terminal having the RFID reader may be one of various kinds of handheld terminals such as personal digital assistant (PDA), notebook computer, portable credit-card inquiry terminal, and so on. The mobile terminals 112, 113, 114, 122, and 123 communicate with the base stations 114 and 124 through one of various radio communication ways such as a code division multiple access (CDMA), wireless universal serial bus (WUSB), wireless local area network (ELAN), and so on. A base station can be variously called, e.g., access point, server, or host, in accordance with a communication way between the mobile terminal and the base station.

The mobile RFID system may have various applications to provide information using RFID tags. For instance, if the mobile terminals 112~114 requests access to the RFID tag 111 attached or formed with an object, for example, a movie poster, the base station 115 and/or the control server 130 provide the mobile terminals 112~114 with information corresponding to the RFID tag 111, e.g., synopsis, casting, theatre, running time, admission fee, so on. However, the present general inventive concept is not limited thereto. Other applications, for example, to provide information on a verity of apparatuses, can be used in the mobile RFID system.

When the mobile terminals 112~114 are accessing the RFID tag 111 at the same time (or with intervals in a predetermined time), an abnormal RFID communication occurs between the mobile terminals 112~114 and the RFID tag 111.

Figure 2:
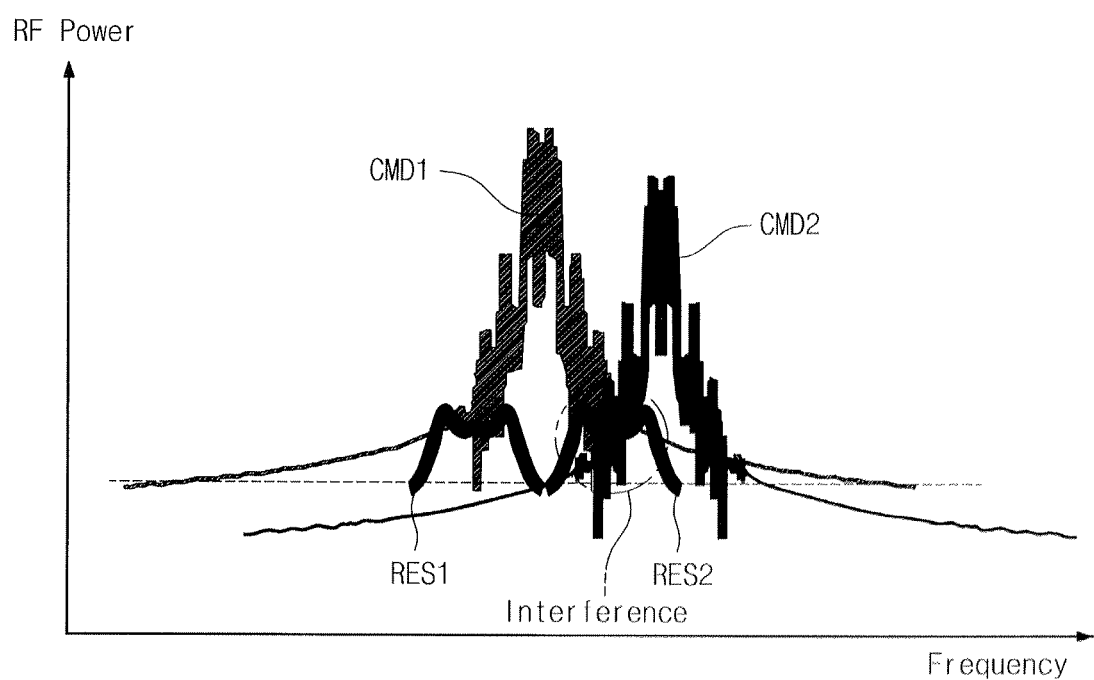
FIG. 2 is a graph illustrating signal interference while coincidentally accessing a single RFID tag by two mobile terminals.

FIG. 2 is a graph illustrating signal interference when a single RFID tag is accessed by two mobile terminals.

Referring to FIG. 2, the mobile terminal 112 of FIG. 1 transmits a command CMD1 for accessing the RFID tag 111. The RFID tag 111 transmits a responding signal RES1 (e.g., a tad ID) to the mobile terminal 112 in response to the command CMD1. Meantime, the mobile terminal 113 transmits a command CMD2 for accessing the RFID tag 111. During this, the mobile terminal 113 receives a signal representing a responding signal RES2 from the RFID tag 111 and the command CMD1 from the mobile terminal 112. If the mobile terminals 112 and 113 are distant from each other longer than a range of signal interference, there is no signal interference. However, it is practically impossible to restrict distances between the mobile terminals 112~114 due to mobility by multiplicities of normal users having the mobile terminals 112~114. Further, it is impractical to regulate points of accessing the RFID tag 111 by the mobile terminals 112~114.

Figure 3:
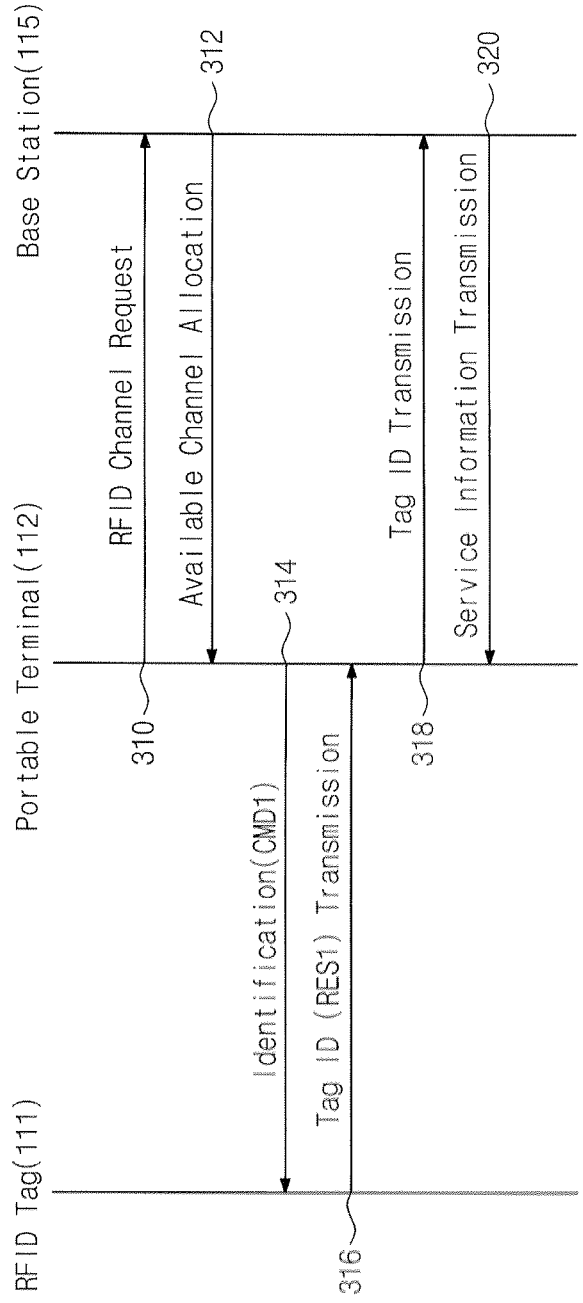
FIG. 3 illustrates an RFID communication method according to an embodiment of the present general inventive concept.

FIG. 3 illustrates an RFID communication method according to an embodiment of the present general inventive concept.

Referring to FIG. 3, the mobile terminal 112 transmits an RFID channel request signal to request an RFID channel from the base station 115 in order to access the RFID tag 111 in operation 310. The base station 115 allocates a predetermined RFID channel to the mobile terminal 112 and transmits information of the allocated channel to the mobile terminal 112 in operation 312. The mobile terminal 112 transmits the command CMD1 to access the RFID tag 111, by way of the allocated RFID channel in operation 314. The RFID tag 111 transmits a tag identification (tad ID), i.e., the responding signal RES1, in response to the command CMD1 in operation 316. The mobile terminal 112 transmits tag identification (tag ID), which is received from the RFID tag 111, to the base station 115 in operation 318. The base station 115 provides the mobile terminal 112 with service information corresponding to the received tag ID in operation 320.

If there is a request for RFID channel by another mobile terminal (e.g., 113), the base station 115 operates to allocate the mobile terminal 113 another RFID channel that is isolated, separated, or different from the previous RFID channel, which has been assigned to the mobile terminal 112, by a predetermined frequency. If the channels allocated to the mobile terminals 112 and 113 are sufficiently isolated from each other, it is able to prevent the command CMD1 of the mobile terminal 112 from overlapping with the responding signal RES2 of the tag 121, or the commands CMD1 and CMD2 of the mobile terminals 112 and 113 from overlapping with each other.

After providing the mobile terminal 112 with service information corresponding to the tag ID, the base station 115 is able to allocate other mobile terminals 113~114 the RFID channel that has been assigned to the mobile terminal 112. If the mobile terminal 112 requests an RFID channel again, the base station 115 may allocate the mobile terminal 112 the RFID channel that is isolated from the channels assigned to the other mobile terminals 113 and 114 by a predetermined frequency. As such, it is permissible to reuse the channels assigned each to the mobile terminals 112~114.

As illustrated in FIG. 3, the RFID communication method may perform that the base station 115 is capable of directly allocating RFID channels to the mobile terminals 112~114. If the base station 115 conducts a function of transmitting signals between the mobile terminals 112~114 and the control server 130, the control server 130 conducts channel allocation and provides service information.

Figure 4:
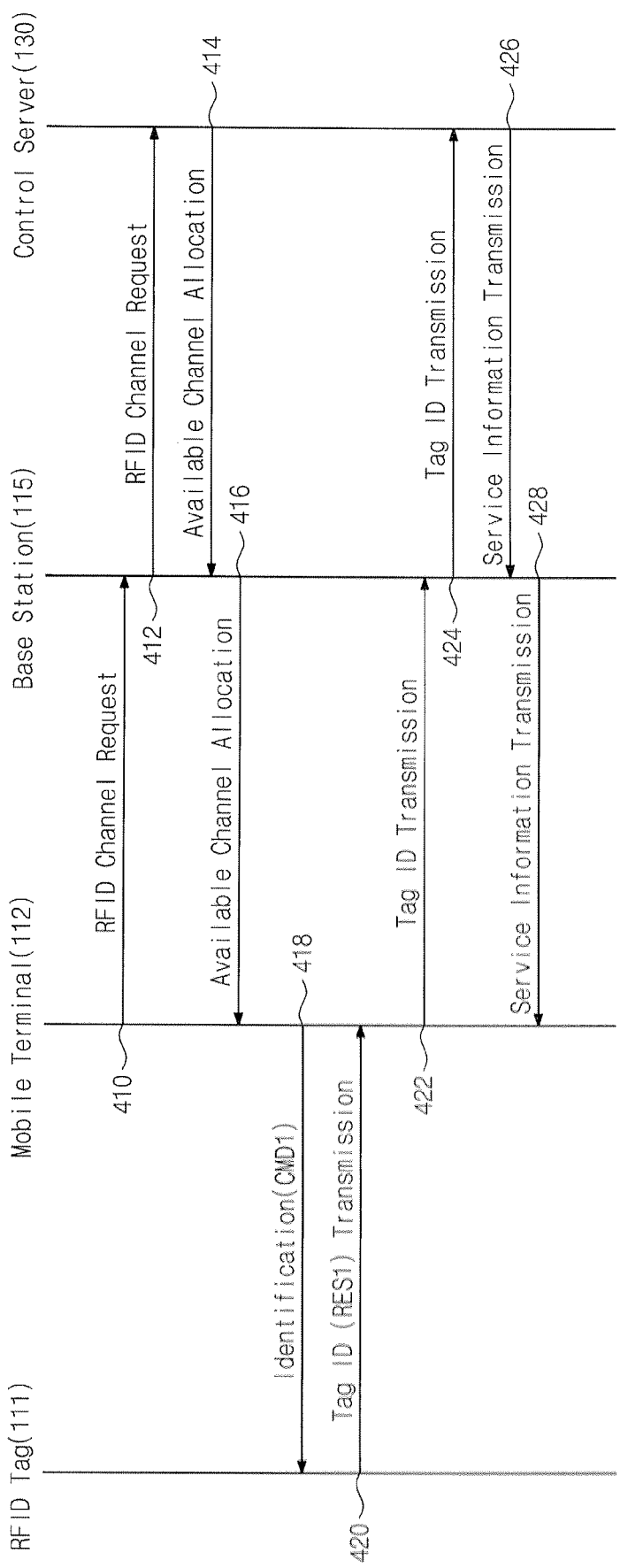
FIG. 4 illustrates an RFID communication method by the RFID communication system including a control server.

FIG. 4 illustrates an RFID communication method by an RFID communication system including the control server 130.

Referring to FIG. 4, the mobile terminal 112 transmits an RFID channel request signal to the base station 115 in order to access the RFID tag 111 in operation 410. The base station 115 transmits the RFID channel request signal to the control server 130 in operation 412. The control server 130 allocates a predetermined RFID-available channel to the mobile terminal 112 in response to the RFID channel request signal, and transmits information of the allocated channel to the base station 115 in operation 414. The base station 115 transmits the information of the allocated RFID-available channel to the mobile terminal 112 in operation 416. The mobile terminal 112 transmits the command CMD1, for accessing the RFID tag 111, by way of the allocated RFID-available channel (step 418). The RFID tag 111 transmits the tag ID, i.e., the responding signal RES1, in response to the command CMD1 in operation 420. The mobile terminal 112 transmits the tag ID to the base station 115 from the RFID tag 111 in operation 422. The base station 115 transmits the tag ID to the control server 130 in operation 424. The control server 130 transmits service information to the base station 115 in correspondence with the tag ID in operation 426. Then, the base station 115 provides the service information to the mobile terminal 112 from the control server 130 in operation 428.

The control server 130 is a device capable of providing service information or contents in correspondence with the RFID tag 111, as like a host server of a mobile communication trader or contents provider.

Even after service information to the mobile terminal 112 through the base station 115 in correspondence with the tag ID, the control server 130 is able to allocate the other mobile terminals 113 and 114 the RFID channel that has been assigned to the mobile terminal 112.

The number of channels allocated to the mobile terminals by the base station 115 is one or plural. The mobile terminals 112~114 are able to more lessen signal interference by using the FP or LBT function when the RFID channels are allocated thereto in pluralities. The FP operates by screening and shifting frequency bands according to given hopping patterns, which is helpful to eluding signal interference in the condition of a wide frequency bandwidth. Differently, the LBT finds an available channel before transmitting data and activates communicate only when there is an empty channel, which is efficient in the condition of a narrow frequency band.

The base station 115 or the control server 130 of the RFID communication system according to an embodiment of the present general inventive concept may provide time information to the mobile terminal 112 in addition to information about available channels. Table 1 illustrates information about operation times and available channels provided to the mobile terminal 112 by the base station 115 or the control server 130.

TABLE 1

| Operation time | Available channel |
|---|---|
| T1 | S1 |
| T2 | S2 |
| ... | ... |
| Tn | Sn |

Referring to Table 1, S1 is a channel allocated to the mobile terminal 112 at the time T1, and S2 is a channel allocated to the mobile terminal 112 at the time T2. Each of the available channels S1, S2, ..., and Sn (S1~Sn) may correspond to the respective operation times T1, T2, ..., and (T1~Tn). The operation times are set in accordance with time ranges, e.g., T1 that is from 0 to 5 sec of a period of time, for example, every minute of every hour, T2 from 5 to 10 sec of the period, and so forth. If each of the available channels S1~Sn respective to the operation times T1~Tn includes one or plural channels, signal interference can be reduced or minimized by the FP or LBT scheme.

Figure 5:
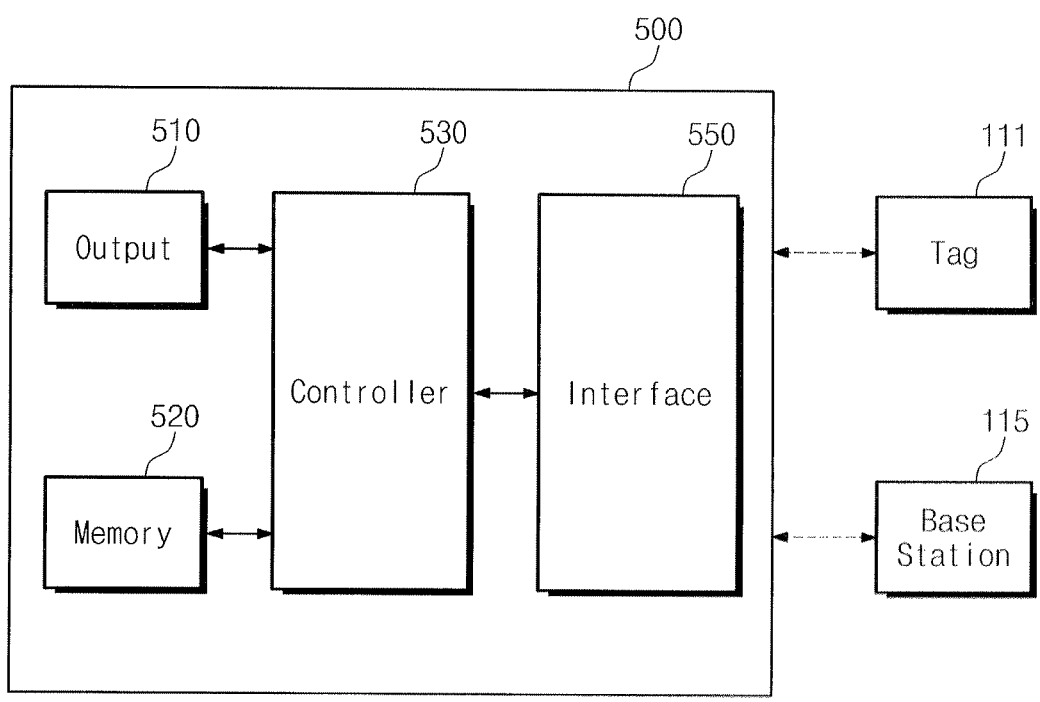
FIG. 5 is a view illustrating a mobile terminal of the system of FIG. 1.
Figure 6:
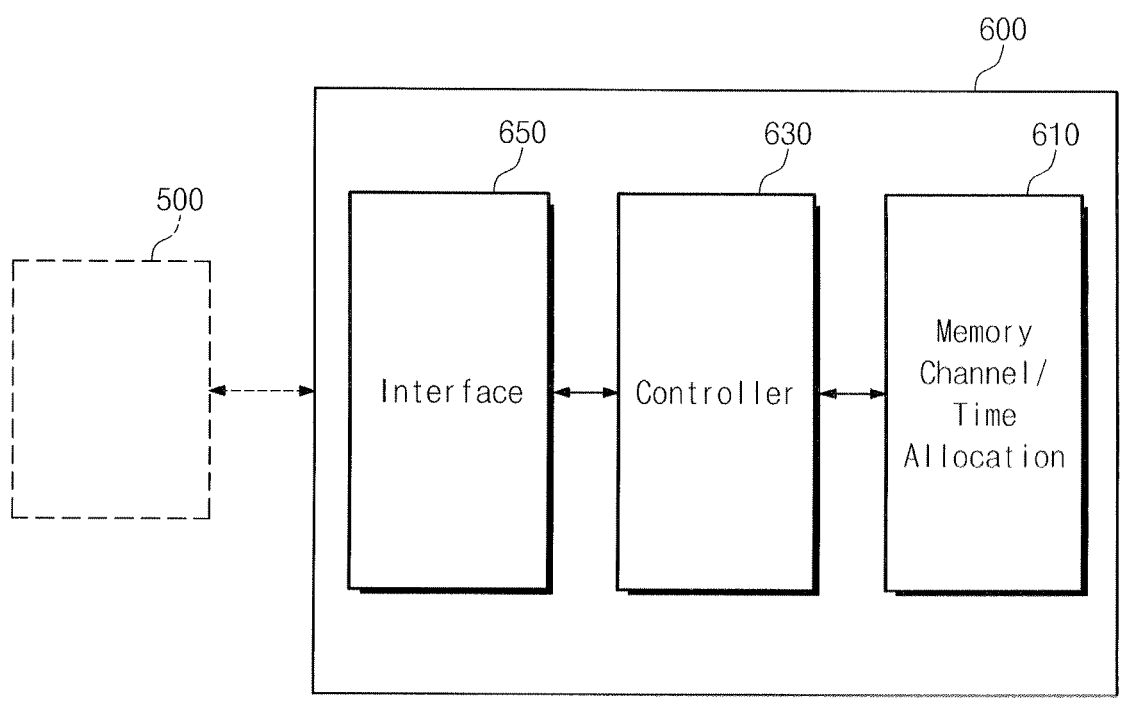
FIG. 6 is a view illustrating a base station of the system of FIG. 1.

FIG. 5 illustrates a mobile terminal 500 of the system of FIG. 1. Referring to FIGS. 1-5, the mobile terminal 500 includes an output unit 510, a memory 520, a controller 530, and an interface 550. The output unit 510 outputs data to correspond to data received from an external device through the interface unit 550 or processed in the controller 530. The outputting data in the output unit 510 is an original function of the mobile terminal 500 as described above. The memory unit 520 may store data to be processed or data to correspond to a wireless communication to communicate with an external device. The interface unit 550 may include a receiver and/or a transmitter to receive data from and/or transmit data to an external device through a wireless communication line. The external device may include a tag 111, a base station 115, another mobile terminal, or an external wireless apparatus to communicate with the mobile terminal 500 and/or the another mobile terminal. The controller 530 controls operations of the output unit 510, the memory unit 520, and the interface unit 550. The mobile terminal 500 may further include a display to display an image, a speaker to generate sound, at least one terminal connectable to a computer or an external device, according to its original function or a function received from and installed or managed by the computer or the external device. Since the mobile terminal 600 is similar to the mobile terminals 112, 113, 114, 122, and 123 of FIG. 1, detailed descriptions thereof will be omitted FIG. 6 illustrates a base station 600 of the system of FIG. 1. The base station 600 may include a memory unit 610 to store data to correspond to channel and/or time allocation, an interface unit 650 to communicate with the mobile terminal 500 of FIG. 5 and having a transmitter and a receiver to correspond to the receiver and the transmitter of the interface unit 550 of FIG. 5, and a controller 630 to control operations of the memory unit 610 and the interface unit 650. Since the base station 600 is similar to the base station 115, 124, detailed descriptions thereof will be omitted.

Figure 7:
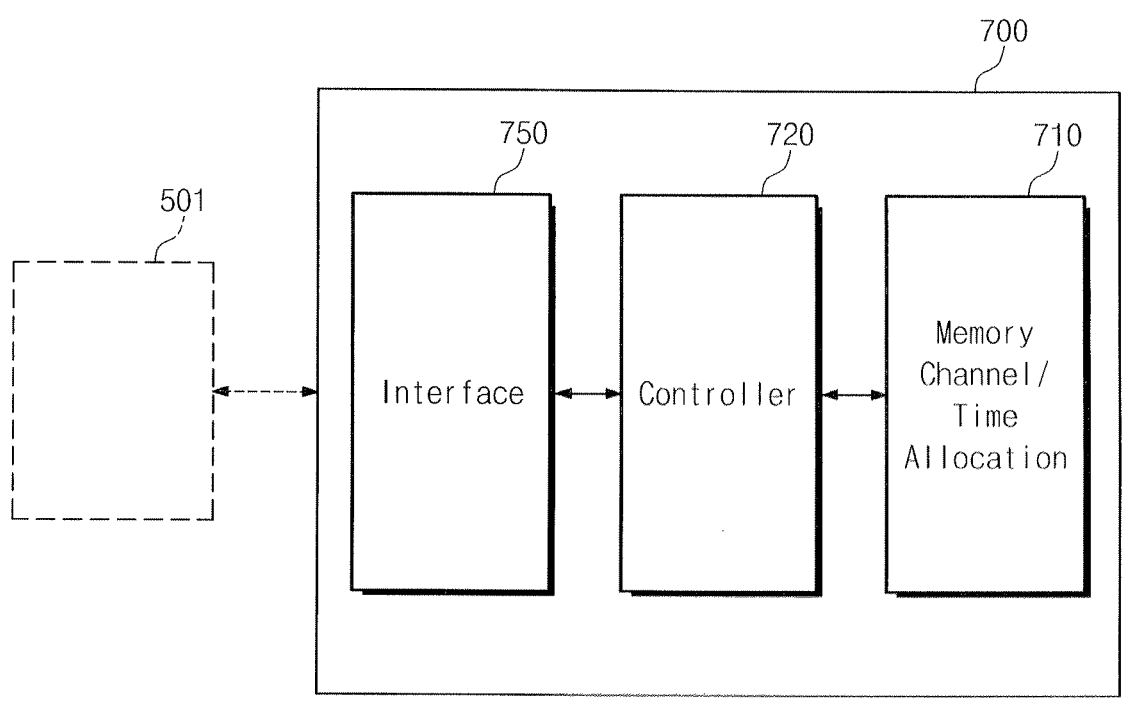
FIG. 7 is a view illustrating a control server of the system of FIG. 1.

FIG. 7 illustrates a control server 700 of the system of FIG. 1. The control server 700 may include a memory unit 710 to store data to correspond to channel and/or time allocation, an interface unit 750 to communicate with the mobile terminal 500 (501) of FIG. 5 through the base station 600 of FIG. 6 and having a transmitter and a receiver to correspond to the receiver and the transmitter of the interface unit 650 of FIG. 6, and a controller 730 to control operations of the memory unit 710 and the interface unit 750. Since the control server 700 is similar to the control server 130, detailed descriptions thereof will be omitted.

Although data corresponding to the channel and/or time allocations can be stored in the memory unit 610 or 710, it is possible that the memory unit 510 of the mobile terminal 500 stores the data corresponding to the channel and/or time allocations. In this case, the base station 600 or the control server 700 may generate a signal designating at least one of the channel and/or time allocations stored in the mobile terminals 500. When the base station 600 or the control server 700 receives information on the data, the base station 600 or the control server 700 may select at least one of the channel and/or time allocations according to a request from the mobile terminal 500. When the base station 600 or the control server 700 receives information on the data from another mobile terminal, the base station 600 or the control server 700 may select at least one of the channel and/or time allocations of the another mobile terminal according to a request from the another mobile terminal so as to avoid interference and/or overlap between the assigned channel and/or time allocations to the mobile terminal 500 and the another mobile terminal.

Accordingly, the mobile terminal 500 can access a tag 111 using the selected channel and/or time allocations and also can access another tag 121 using the selected channel and/or time allocation. However, it is also possible that the mobile terminal 500 can access the another tag 121 using another selected channel and/or time allocations by communicating with the base station to receive a signal indicating the another selected channel and/or time allocations.

Since a first area 110 is defined as an area in which the tag 111, mobile terminals 500 (112, 113, and 114), and the base station 115 can communication with one another, and since a second area 120 is defined as an area in which the tag 121, mobile terminals 500 (122 and 123, and the base station 124 can communication with one another, the selection of the channel and/or time allocations can be determined according to the first area 110 and/or the second area 120.

If the control server 130 has information on characteristics of the first area 110 and the second area 120, the control server 130 can determine a method of selecting the channel and/or time allocations to correspond to the respective mobile terminals 500 (112, 113, 114, 122, and 123) according to the characteristics of the first area 110 and the second area 120.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An RFID communication method for a mobile terminal communicating with a base station, the method comprising:
   requesting channel allocation from the mobile terminal to the base station for RFID communication between the mobile terminal and an RFID tag;
   allocating a channel from the base station including sending the channel allocation request from the base station to a control server for communication with the RFID tag and transmitting the allocated channel to the base station from the control server; and
   communicating directly with the RFID tag through the allocated channel, the mobile terminal including an RFID reader to communicate with the RFID tag through the allocated channel.

2. The method of claim 1, wherein the number of the allocated channels is one or plural.

3. The method of claim 1, wherein the allocating the channel comprises allocating one or more channels each to plurality of operation times from the base station.

4. The method of claim 3, wherein the communicating with the RFID tag through the allocated channel is carried out by one of frequency hopping and listen-before-talking schemes through the plural channels respective to the plural operation times.

5. The method of claim 1, wherein the communicating the RFID tag comprises:
   accessing the RFID tag through the allocated channel;
   receiving tag identification from the RFID tag;
   transmitting the tag identification to the base station; and
   receiving service information from the base station in correspondence with the tag identification.

6. The method of claim 1, wherein the communicating with the RFID tag comprises accessing the RFID tag through the allocated channel;
   receiving tag identification from the RFID tag;
   transmitting the tag identification to the control server from the base station;
   transmitting service information to the base station from the control server in correspondence with the tag identification; and
   receiving the service information from the base station in correspondence with the tag identification.

7. An RFID communication method of an RFID system including a control server, a base station, and a mobile terminal, the method comprising:
   sending a channel allocation request to the base station from the mobile terminal for communication between the mobile terminal and an RFID tag;
   sending the channel allocation request to the control server from the base station for communication between the mobile terminal and the RFID tag;
   transmitting an allocated channel to the base station from the control server;
   transmitting the allocated channel to the mobile terminal from the base station; and
   communication by the mobile terminal directly with the RFID tag through the allocated channel, the mobile terminal including an RFID reader to communicate with the RFID tag through the allocated channel.

8. The method of claim 7, wherein the number of the channels allocated by the control server is one or plural.

9. The method of claim 7, wherein the transmitting the allocated channel to the base station from the control server comprises transmitting one or more channels, which are allocated to the plurality of times, from the control server.

10. The method of claim 9, wherein the communicating with the RFID tag is carried out by one of frequency hopping and listen-before-talking schemes through the plural channels respective to the plural times.

11. The method of claim 7, wherein the communicating the RFID tag comprises:
   accessing the RFID tag through the allocated channel;
   receiving tag identification from the RFID tag;
   transmitting the tag identification to the base station; and
   receiving service information from the base station in correspondence with the tag identification.

* * * * *